(12) United States Patent
Wood

(10) Patent No.: US 9,861,032 B2
(45) Date of Patent: Jan. 9, 2018

(54) LEVELING TOOL BAR

(71) Applicant: Ten X Strategies, LLC, Spokane, WA (US)

(72) Inventor: Christopher E Wood, Spokane, WA (US)

( * ) Notice: Subject to any disclaimer, the term of this patent is extended or adjusted under 35 U.S.C. 154(b) by 19 days.

(21) Appl. No.: 14/960,736

(22) Filed: Dec. 7, 2015

(65) Prior Publication Data
US 2016/0338258 A1 Nov. 24, 2016

Related U.S. Application Data

(60) Provisional application No. 62/147,198, filed on Apr. 14, 2015.

(51) Int. Cl.
| | | |
|---|---|---|
| *A01C 7/20* | (2006.01) | |
| *A01B 23/04* | (2006.01) | |
| *A01B 19/06* | (2006.01) | |
| *A01B 63/00* | (2006.01) | |
| *A01B 73/06* | (2006.01) | |

(52) U.S. Cl.
CPC .............. *A01C 7/208* (2013.01); *A01B 23/04* (2013.01); *A01B 63/004* (2013.01); *A01B 73/065* (2013.01)

(58) Field of Classification Search
CPC ....... A01B 23/04; A01B 73/065; A01B 15/14; A01B 15/20; A01B 19/06; A01C 7/201; A01C 7/208

USPC .................................................. 172/776, 481
See application file for complete search history.

(56) References Cited

U.S. PATENT DOCUMENTS

| | | | | | |
|---|---|---|---|---|---|
| 4,676,321 | A | * | 6/1987 | Friggstad | A01B 23/043 172/310 |
| 5,941,317 | A | * | 8/1999 | Mansur | A01B 63/023 172/2 |
| 6,851,484 | B2 | * | 2/2005 | Klompien | E02F 3/7627 172/191 |
| 2009/0236108 | A1 | * | 9/2009 | Stark | A01B 63/245 172/311 |
| 2010/0314144 | A1 | * | 12/2010 | Hennes | A01B 21/083 172/178 |
| 2016/0050841 | A1 | * | 2/2016 | Tobin | A01C 7/203 111/163 |

* cited by examiner

*Primary Examiner* — John G Weiss
(74) *Attorney, Agent, or Firm* — Timberline Patent Law Group

(57) ABSTRACT

Representative implementations of devices and techniques provide a tool bar comprising a structure having a plurality of sections arranged in geometric forms. The geometric forms may change shape to keep a tool that is attached to the structure in a desired position while the tool bar is being used on uneven terrain, such as on a hillside or while the tool bar is rotated or pivoted at an angle with respect to the direction of travel. Changing the shape of the geometric forms can also result in rotating the tool attached to the structure with respect to the tool bar.

20 Claims, 8 Drawing Sheets

A) Level Tool Bar

B) Angled Tool Bar

FORE AND AFT ROTATION

LEVELING TOOL BAR

PRIORITY CLAIM AND CROSS-REFERENCE TO RELATED APPLICATION

This application claims the benefit under 35 U.S.C. §119 (e)(1) of U.S. Provisional Application No. 62/147,198, filed Apr. 14, 2015, which is hereby incorporated by reference in its entirety.

BACKGROUND

Various overland implements are configured for planting or harvesting a crop, or for preparing a field for planting, for example (such as farming equipment, and the like). The implement may be self-propelled, pulled behind an overland vehicle (such as a farm tractor, for instance), or some combination. The implement may include tools to perform the desired preparing, planting, or harvesting functions, or other desired functions. Sometimes, the implement may be used along slopes or on uneven terrain. In those cases, negotiating sidehills and other uneven terrain with the implement can result in inconsistent or undesirable results from the implement, as compared to its performance when negotiating level terrain.

For example, the tools mounted to the implement are generally adjusted for a fixed depth of operation with respect to the field. This is often the case with planters, seed drills, and the like, which can be depth-adjusted for the desired application. On level terrain, furrows are dug and/or seeds are deposited by the implement at a fixed depth, based on the depth-adjustment of the tools. However, while negotiating slopes or sidehills, furrows may be dug or seeds deposited deeper (or more shallow) than while negotiating level terrain. This is often because of the angle of the tools, which changes with respect to the true horizon when the implement is negotiating uneven terrain. Instead of a consistent and uniform depth of operation, the result is often as varying as the terrain.

Further, while the implement is cutting furrows on a sidehill, for example, some soil from the furrows cut on a higher point of the hill may fall into furrows cut on lower portions of the hill. This can result in a large variance in furrow depth along the sidehill. If the implement is a planter or drill, this can also increase a planting depth of seed planted on the lower portions of the hill. In these cases, crop production can suffer on the sidehill, based on non-uniform and/or undesirable furrow and planting depths.

BRIEF DESCRIPTION OF THE DRAWINGS

The detailed description is set forth with reference to the accompanying figures. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions of components shown in the illustrations of the figures are for example and ease of discussion, and other shapes and or dimensions may be used and remain within the scope of the disclosure, unless specified otherwise.

FIG. 2(A) illustrates an example tool bar with tools attached. FIG. 2(B) illustrates an example yoke and an example tongue attached to the example tool bar of FIG. 2(A) in perspective view. FIG. 2(C) illustrates the example yoke and the example tongue attached to the example tool bar of FIG. 2(A) in plan view. FIG. 2(D) illustrates detail of a cross-section of the example tongue. FIG. 2(E) illustrates detail of an example planting tool. FIG. 2(F) illustrates detail of an example actuator. FIG. 2(G) illustrates detail of the example tool bar of FIG. 2(A) in side view.

FIG. 5(B) shows the tool bar at a 33.56° inclination; FIG. 5(C) shows the tool bar at a 41.41° inclination; FIG. 5(D) shows the tool bar at a 48.19° inclination; and FIG. 5(E) shows the tool bar at a 54.31° inclination.

FIG. 6(B) shows the tool bar at a 33.56° rotation; FIG. 6(C) shows the tool bar at a 41.41° rotation; FIG. 6(D) shows the tool bar at a 48.19° rotation; and FIG. 6(E) shows the tool bar at a 54.31° rotation.

DETAILED DESCRIPTION

Introduction

Figure 1:
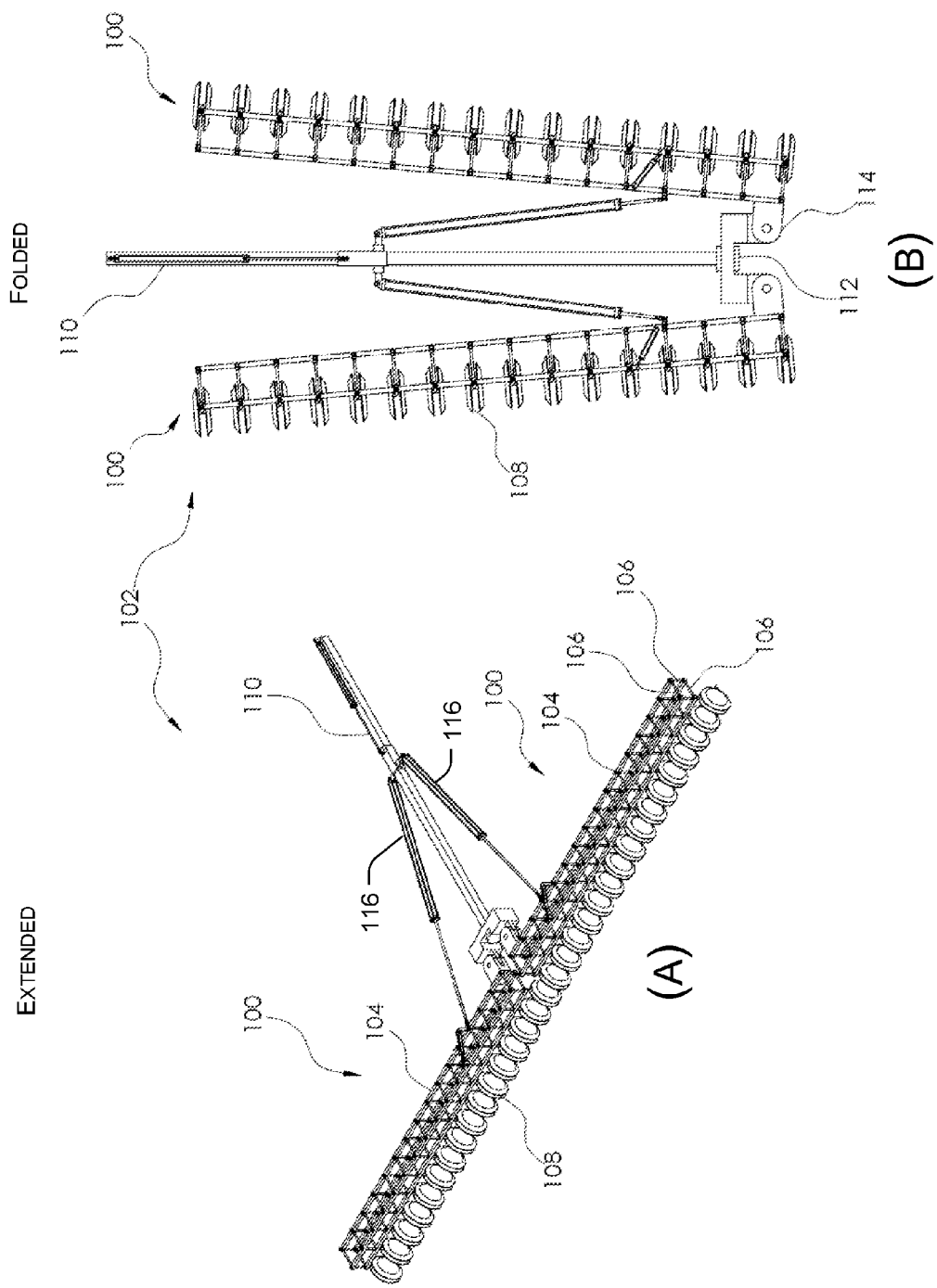
FIG. 1 illustrates two views at (A) and (B) of an example application of a leveling tool bar assembly, according to an embodiment. In one view at FIG. 1(A), the tool bar assembly is extended, in a position for use, for example. In the other view at FIG. 1(B), the tool bar assembly is folded, in a position for storage or transport, for example.

An example leveling tool bar is disclosed, for use with a wide range of agricultural implements, such as a seed or grain drill, for instance. For example, when used with a seed drill, the leveling tool bar uses one or more configurable arm sections with the drill components to provide multiple vertical furrows in hillside terrain. The tool bar can be configured for a wide range of inclines in the terrain while in an extended position and can also be folded for storage and/or transport.

In one embodiment, the leveling tool bar includes a structure comprising a plurality of sections arranged in geometric forms, such as parallelograms. In the embodiment, the geometric forms may change shape to keep the tool (drill shank and boot, for example) that is attached to the structure in a vertical position (i.e., plumb, perpendicular to the true horizon), while the tool bar is being used on uneven terrain, such as on a hillside.

In another embodiment, the geometric forms may change shape to keep the tool that is attached to the structure in a position or alignment that is parallel to the centerline of the tongue of the implement (hereinafter a "forward" position), while the tool bar is rotated at an angle with respect to the centerline of the tongue, such that one end of the tool bar leads the other end of the tool bar while the tool bar is pulled by the tongue. In some implementations, changing the shape of the geometric forms has the effect of rotating the tool attached to the structure with respect to the tool bar.

In an implementation, the leveling tool bar uses one or more actuators (e.g., hydraulic or pneumatic cylinders, servos, electro-mechanical devices, cable mechanisms, and the like) to configure the tool bar for the various inclines and/or rotations. For example, the one or more actuators change the shape of the geometric forms of the tool bar structure to keep the tool vertical and/or in a forward alignment. In another embodiment, the leveling tool bar includes one or more other actuators to provide rotation of the tool bar, as well as the folding action for storage and/or transport of the tool bar. In various examples, the actuators dynamically change the shape of the geometric forms of the tool bar structure and/or the other actuators provide rotation of the tool bar while the implement is on-the-go, without requiring the operator to stop the implement during operation.

Description of an Example Leveling Tool Bar

The following description refers to the drawings shown in FIGS. 1-6. Several embodiments of leveling tool bars are described. Descriptions of the embodiments (including notes on the drawings) may include examples of materials, types of fabrication, and dimensions. However, the descriptions are for ease of understanding and are not intended to be limiting. Other suitable materials, types of fabrication, and dimensions may be used to construct a leveling tool bar 100 without departing from the scope of this disclosure. Further, many embodiments may include multiple leveling tool bars 100. The use of the singular "tool bar" in this disclosure also applies to embodiments that include multiple tool bars.

FIG. 1 illustrates two views at (A) and (B) of an example application of a leveling tool bar assembly 100, according to an embodiment. In one view (shown at FIG. 1(A)), two tool bar assemblies 100 are extended, in a position for field use, for example. In the other view (shown at FIG. 1a), the tool bar assemblies 100 are folded, in a position for transport, for example.

A leveling tool bar assembly 100 may be used in and on various mechanical devices and machinery ("implement 102"), where a variable leveling adjustment may be desirable to position one or more components (e.g., tools) of the implement 102. For example, in the illustration of FIG. 1, two leveling tool bar assemblies 100 are installed on an implement 102 (e.g., a seed drill assembly, or the like), arranged to be pulled behind a farm vehicle. The illustrated seed drill assembly is an example application of a leveling tool bar assembly 100. It is provided for ease of discussion, and is not intended to be limiting, as the tool bar assembly 100 may be used with a variety of implements 102.

Figure 2:
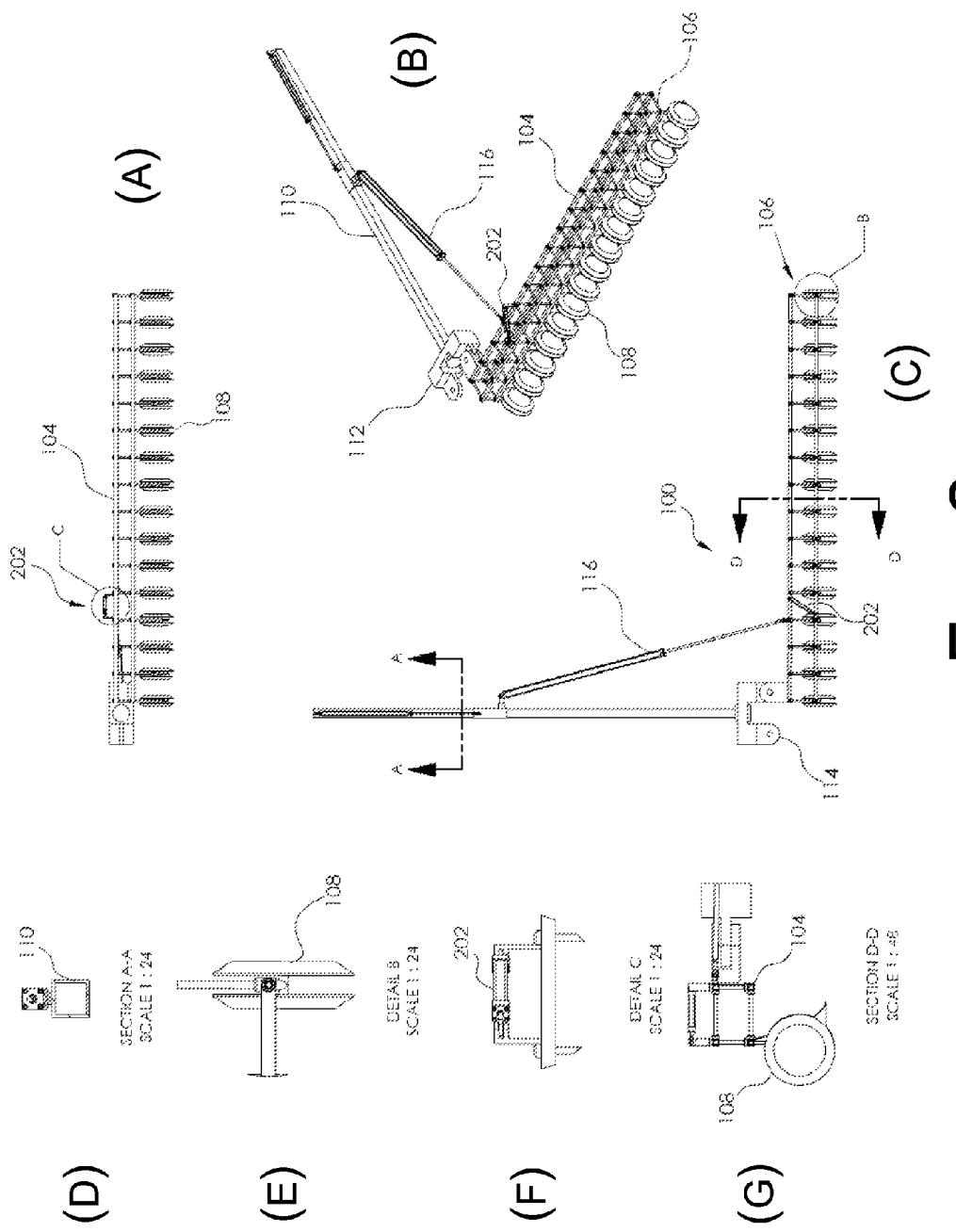
FIG. 2 illustrates various detail views at (A)-(G) of the leveling tool bar assembly of FIG. 1, according to an embodiment.
Figure 3:
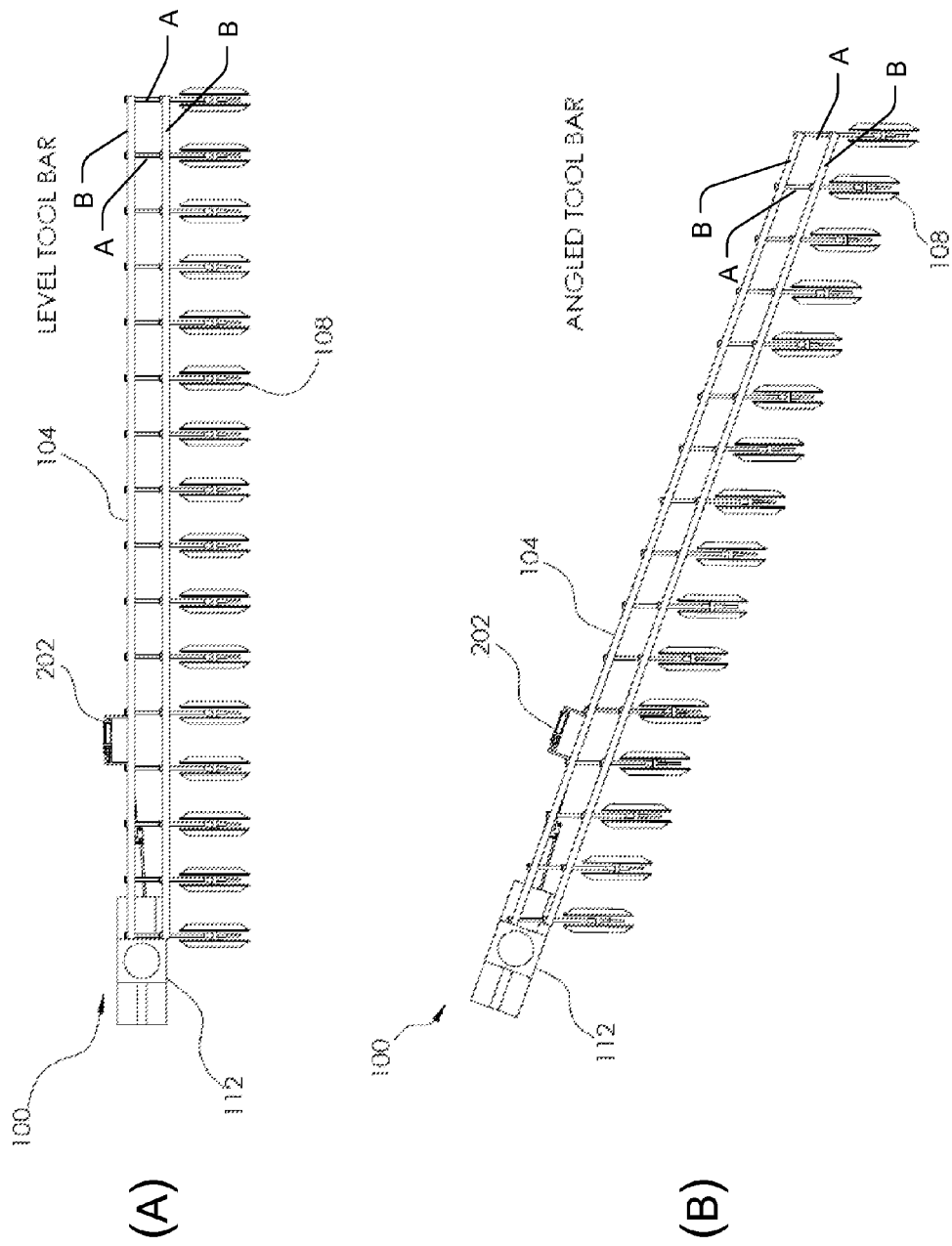
FIG. 3 illustrates two profile views at (A) and (B) of the leveling tool bar assembly of FIG. 1: one (at FIG. 3(A)) in a level state and another (at FIG. 3(B)) in an angled state, according to an embodiment.
Figure 4:
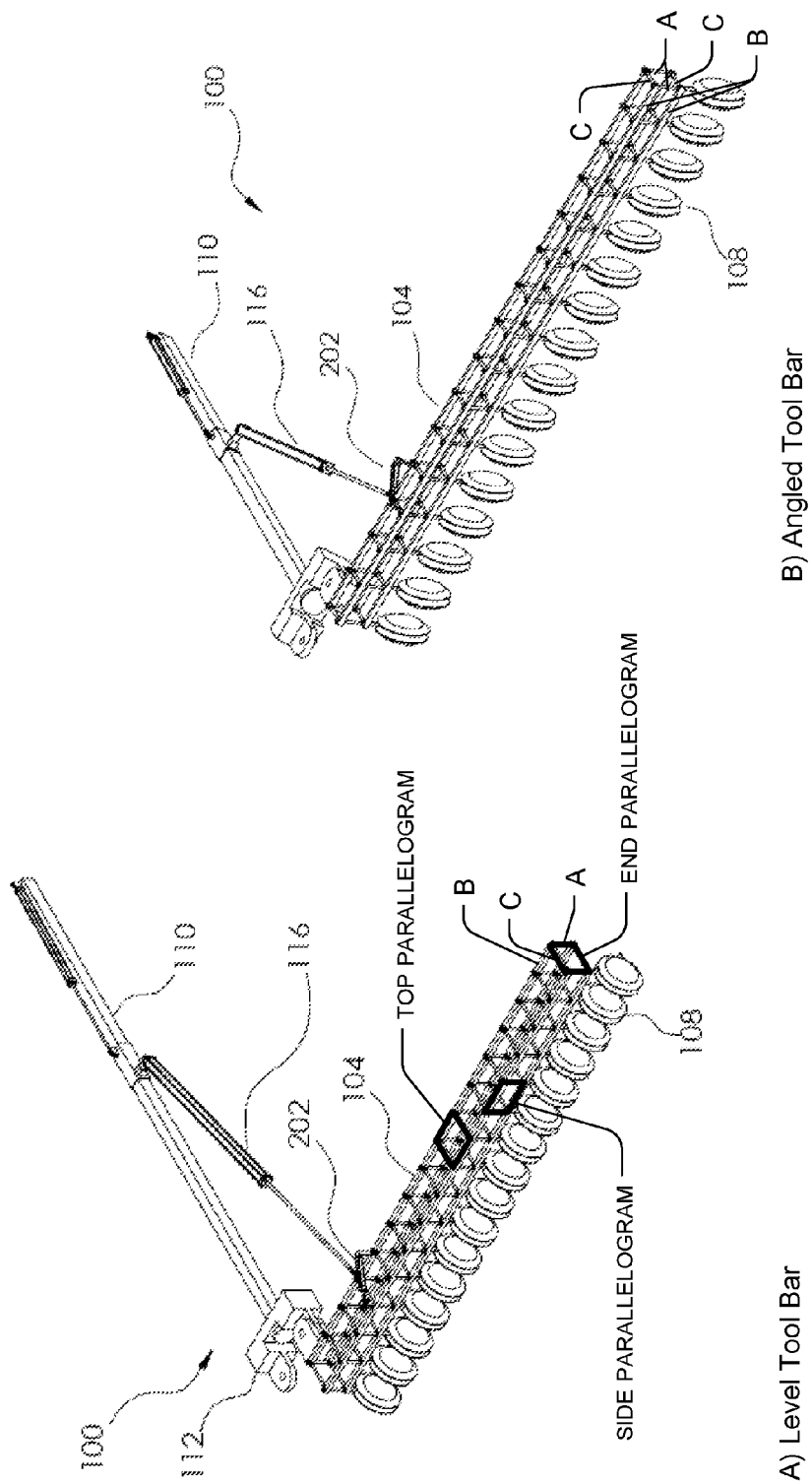
FIG. 4 illustrates two perspective views at (A) and (B) of the leveling tool bar assembly of FIG. 1, one (at FIG. 4(A)) in a level state and another (at FIG. 4(B)) in an angled state, according to an embodiment.

As shown in FIGS. 1-6, in various implementations the leveling tool bar assembly 100 may include a lattice-like structure 104 comprising a plurality of rigid sections 106 (e.g., rods, beams, bars, braces, links, supports, struts, etc.) of similar, equal, or differing predetermined lengths, arranged in geometric forms. The lattice-like structure comprises an open framework of rigid strips of material (the sections 106), comprising a regular pattern of variable-angle polygons. In an embodiment, the sections 106 are arranged to form regular polygons, such as parallelograms. As shown in FIG. 4, for example, the lattice-like structure 104 may include top and bottom facing parallelograms, side facing parallelograms, end facing parallelograms, and so forth. The parallelograms of FIG. 4 are examples, and a structure 104 may include other geometric shapes in other embodiments, including different types of geometric shapes on different portions of the structure 104 (e.g., parallelograms on one face and triangles on another face of the structure 104, etc.). In various implementations, one or more tools 108 may be coupled to one or more of the sections 106, for example.

In some cases it may become useful to reduce the overall size or width of the implement 102, particularly for storage and/or transport. Consequently, an implement 102, such as the seed drill, may be arranged to fold at preselected points, resulting in a more compact overall footprint. For example, the seed drill in FIG. 1 may be arranged to fold at the points between each of the tool bars 100.

In an implementation, the structures 104 of the tool bars 100 may be attached to the tongue 110 with a yoke 112, or the like, having hinges 114 for folding the tool bars 100 for storage and/or transport. In another implementation, the yoke 112 may be arranged to swivel with respect to the tongue 110.

In an embodiment, the tool bar 100 may include one or more actuators 116 for extending the tool bar 100 in position for use (e.g., field, working, etc.), or for retracting the tool bar 100 in a folded position for storage and/or transport. In various embodiments, as shown in FIGS. 1, 2, and 4, the actuators 116 may be pivotally attached at one end to one structure 104 and pivotally attached at the other end to the tongue 110 of the implement 102. In that configuration, an actuator 116 may pull the tool bar 100 towards the tongue 110 to fold the tool bars 100, or push the tool bar 100 away from the tongue 110 to extend the tool bars 100.

In an embodiment, the shape of the geometric forms (e.g., parallelograms) formed by the sections 106 can be changed to keep the tool(s) 108 (disk, shank, and boot, for example) vertical (i.e., plumb, perpendicular to the true horizon) while the tool bar 100 is being used on uneven terrain, such as on a hillside. In another embodiment, the shape of the geometric forms (e.g., parallelograms) can be changed to keep the tool(s) 108 aligned in a forward direction, aligned parallel to the centerline of the tongue, while the tool bar 100 is pivoted and/or rotated at an angle that is greater than or less than perpendicular to the centerline of the tongue. Accordingly, the sections 106 are coupled together with hinges, joints, or other variable/moveable mechanical connections (i.e., forming the geometric shapes).

For example, in some cases an implement 102, such as a seed drill for instance, may be operated on a hillside to place seeds in the soil of the hillside. Without a leveling mechanism, the tools of the seed drill are generally perpendicular to the surface of the hillside (e.g., the angle or incline of the hillside), rather than to the true horizon. In such an instance, the seed may be placed at a less than optimal depth in the hillside soil by the seed drill, causing issues with seedling emergence. In one example, the seed may be placed too deep, requiring the seedling to travel a greater than optimal distance to emerge from the soil, and increasing the possibility that the seedling may die prior to emergence. In another example, as parallel furrows are made on the hillside, soil on the high side of the hillside may fall onto seeded furrows on the lower side of the hillside, exacerbating the seed emergence problem.

In an implementation, as shown in FIGS. 2, 3, and 4, one or more actuators 202 are coupled (e.g., pivotally attached) to at least two sections 106 each of the structure 104. For example, each end of an actuator 202 may be pivotally attached to a section 106. In the implementation, the actuators 202 pull or push on the sections 106 to change the attachment angles of the sections 106, also changing the shape of the geometric shapes formed by the sections 106, since the sections 106 are coupled together at moveable joints. In other words, the actuator 202 is arranged to change one or more angular dimensions of vertices of the geometric shapes by extending or retracting a rod of the actuator 202.

Figure 5:
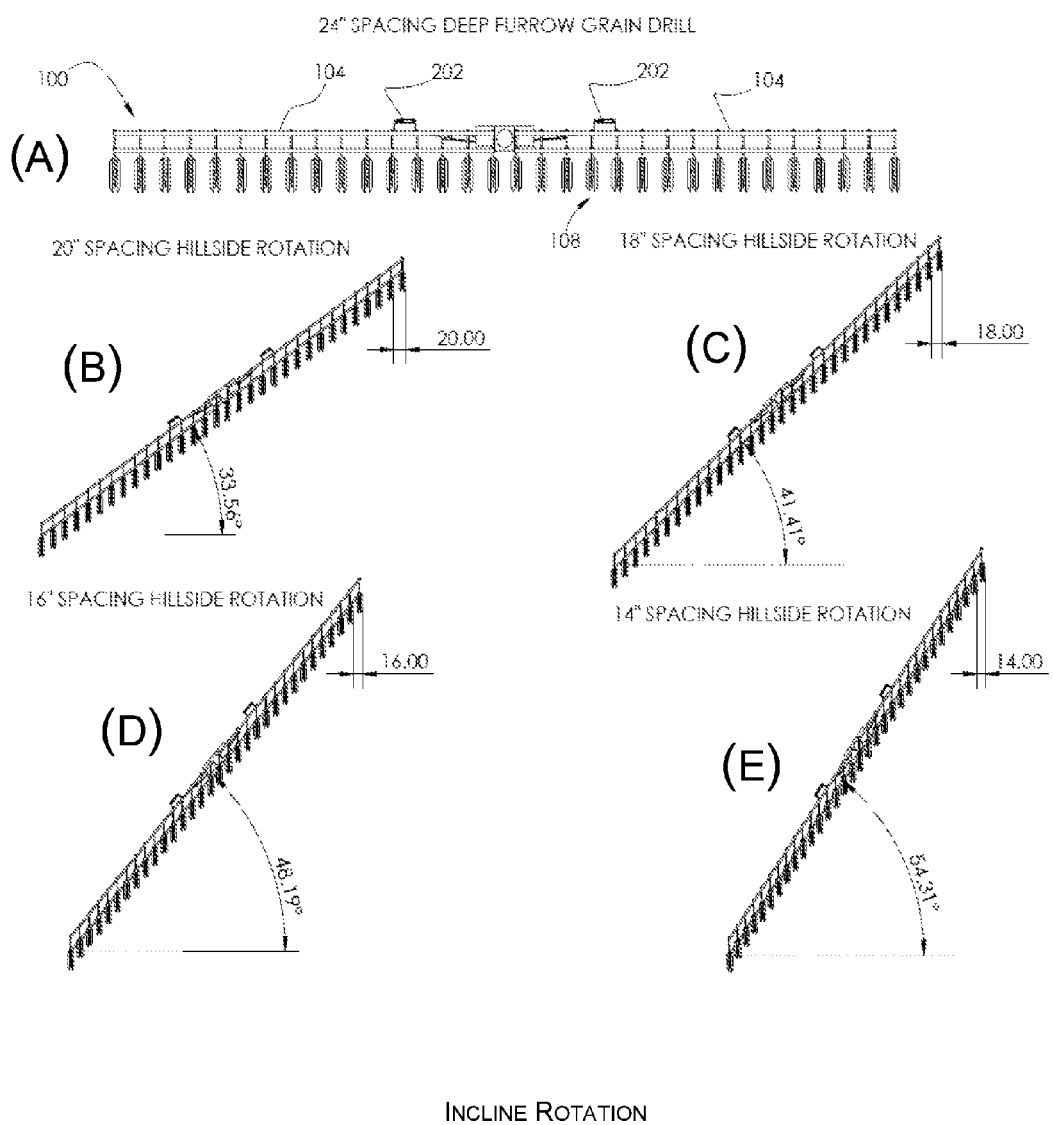
FIG. 5 illustrates several plan views at (A)-(E) of the leveling tool bar assembly of FIG. 1, according to an embodiment. The illustrations show the tool bar in a level state at FIG. 5(A), and also show the tool bar assembly at several incline angles, according to the embodiment.

In the implementation, as shown in FIGS. 3 and 5, changing the geometric shape of one group of sections 106 likewise changes the geometric shape of all of the similarly coupled groups of sections 106 of the lattice-like structure 104, based on the way the sections 106 are coupled together. In various embodiments, the actuators 202 may be located at various locations along the structure 104, and may be coupled in any of various arrangements to move the sections 106 at their moveable joints, changing the angle of the joint connections between sections 106. Further, in various embodiments, any number of actuators 202 may be used with the tool bar 100 to change the geometric shape of one or more groups of sections 106.

In an implementation, as shown in FIGS. 3-6, the tool(s) 108 coupled to the structure 104 are moved to a vertical position, with regard to the true horizon rather than perpendicular to the sloped surface of the terrain, by activating the actuators 202 and changing the shape of the geometric forms of the groups of sections 106. For example, as shown in FIGS. 1-5, the geometric forms may comprise parallelograms. Thus, one pair of sections 106 comprising a pair of sides of a parallelogram (shown in FIGS. 3 and 4 as sides "A") may be pulled or pushed by the actuators 202 to change an angle of the sides A relative to another pair of sections 106 comprising a pair of sides of the parallelogram (shown in FIGS. 3 and 4 as sides "B").

In an embodiment, changing the angle of the sides A with respect to the sides B allows the sides A to become or remain vertical while the sides B are inclined or declined at an angle parallel to the slope of the sidehill being traversed. Further, coupling the tools 108 to the sides A allows the tools 108 to be vertical, irrespective of the slope of the sidehill being traversed. In an implementation comprising a seed drill for example, keeping the tools 108 (e.g., disk, shank, and boot) vertical allows the seed drill to cut furrows at a uniform depth and to place the seed at a desired soil depth on the sidehill (e.g., within the moisture layer and/or at a shortest possible travel distance to emerge). Further, cutting vertical furrows on a sidehill in this manner can reduce the tendency for soil at higher points of the hill to fall into furrows on lower points of the hill. This can help seed emergence as well as help keep soil from migrating to the lower areas of sidehills.

In various embodiments, as shown in FIG. 5, the distance between the sides A, and thus between the tools 108, can decrease as the angle of the tool bar 100 increases (with respect to the true horizon) to conform to the angle of a sidehill. This is a result of the change to the geometric shapes formed by the sections 106. Consequently, the distance between furrows (in the case of a seed drill) may decrease with an increasing angle to the sidehill.

However, as shown in FIG. 5, very steep hillsides can be traversed and a reasonable furrow width can be maintained. For example, a tool bar 100 with 24" furrow spacing, as illustrated at FIG. 5(A) (e.g., section 106 sides "A" are located 24" apart on the structure 104) at 0° (level ground) has a furrow distance of 14" when angled at 54°, as illustrated at FIG. 5(E), which can be within an acceptable range of furrow spacing for many crops. In alternate embodiments, other furrow spacing can be achieved by tool bars 100 with greater or lesser section 106 dimensions, as illustrated at FIGS. 5(B)-5(D) for example.

Figure 6:
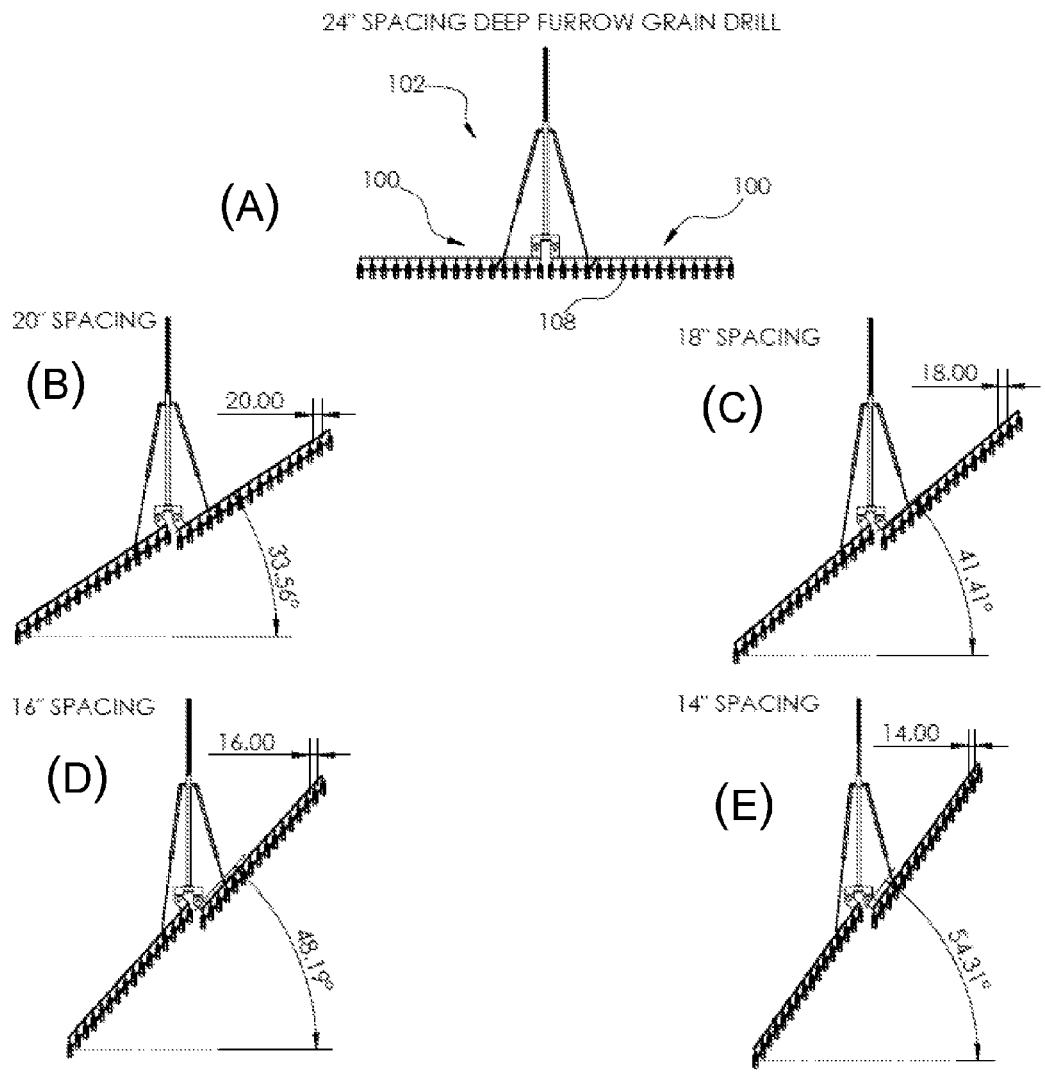
FIG. 6 illustrates several top views at (A)-(E) of an example leveling tool bar assembly, according to an embodiment. The illustrations show the tool bar in a perpendicular state with no rotation at FIG. 6(A). The illustrations, and also show the tool bar assembly at various fore and aft rotation angles, according to the embodiment.

In another implementation, as shown in FIG. 6, the tool bar 100 may be rotated (at the yoke 112, for example) fore and aft with respect to the tongue 110 such that one end of the tool bar 100 leads the other end of the tool bar 100 as the implement 102 is pulled in the field. In such an implementation, the tool bar 100 is rotated to a non-perpendicular angle with respect to the centerline of the tongue 110. In an implementation, the tool bar 100 is rotated using the actuators 116 (e.g., pulling and pushing the structures 104 with respect to the centerline of the tongue 110). In alternate implementations, the tool bar 100 may be rotated using other components and/or systems.

In various scenarios it may be desirable for one end (e.g., the right or left extent of the tool bars 100) of the implement 102 to cut furrows or to place seed ahead of the other end of the implement 102. One possible scenario includes while traversing a sidehill, where one side of the implement 102 is on a higher portion (i.e., more elevation) of the sidehill and the other portion of the implement 102 is on a lower portion (i.e., less elevation) of the sidehill. In such a scenario, it may be advantageous to cut furrows in the upper elevation portion of the sidehill first, to avoid soil falling in furrows cut on the lower elevation portion of the sidehill. Thus, the tool bar 100 may be rotated such that the end of the tool bar 100 that is on the upper elevation portion of the sidehill leads the other end of the tool bar 100 that is on the lower elevation portion of the sidehill, while the implement traverses the sidehill.

In other scenarios, it may be desirable for one end (e.g., the right or left extent of the tool bars 100) of the implement 102 to cut furrows or to place seed ahead of the other end of the implement 102 while traversing relatively level terrain. Further, in some scenarios, it may be desirable to select and/or adjust a tool 108 spacing (or furrow spacing, for instance) via rotating the tool bars 100. In various implementations, the tool 108 and furrow spacing (via rotating the tool bars 100) can be performed dynamically while on-the-go (e.g., while the implement 102 is in motion, cutting furrows, planting seed, etc.).

For example, in some regions, residual straw is left in the fields after harvest to reduce wind erosion of the soil. When cutting furrows through the residual straw during the next planting, the straw can get caught between the tools 108, plugging the planter assemblies of the implement 102 at one or more of the furrow rows. In an implementation, instead of having to stop the implement 102 and clear the straw plugs, the operator can change the furrow spacing (making it greater, for example) on-the-go, via rotating the tool bars 100 fore and aft, allowing the straw plugs to clear through the tools 108. The operator can then reset the proper spacing for the tools 108 on-the-go (either manually or automatically, as discussed herein), affecting only a few feet of seed bed, and all without having to stop the implement 102.

Further, it may be desirable to plant a crop with a narrower furrow spacing to minimize weeds that compete with the crop, or for other reasons. However, as described above, this may be problematic due to residual straw left on the field. In such a scenario, the crop may be planted with narrow furrow spacing as desired, and the tool 108 spacing of the implement 102 may be adjusted very quickly and on-the-go while planting as needed, by rotating the tool bars 100 fore and aft to clear straw plugs (or for other reasons). Then, the tool bars 100 can be quickly returned to the desired tool 108 spacing by rotating the tool bars 100 again (in a reverse direction, for example) on-the-go, after clearing the tools 108 of straw.

As shown in FIG. 6, in various embodiments, the tool(s) 108 coupled to the structure 104 are moved to (or maintained in) a forward facing position with regard to the direction of travel of the implement 102, and are aligned parallel to the centerline of the tongue 110 rather than being mis-aligned with respect to the direction of travel or to the centerline of the tongue 110, by activating the actuators 202 and changing the shape of the geometric forms of the groups of sections 106. For example, as shown in FIGS. 1 and 4, the geometric forms may comprise parallelograms. Thus, as described above, one pair of sections 106 comprising a pair of sides of a parallelogram (sides A or C, for example) may be pulled or pushed by the actuators 202 to change an angle of the sides relative to another pair of sections 106 comprising another pair of sides of the parallelogram (sides B, for example).

In an embodiment, changing the angle of the sides C with respect to the sides B allows the sides C to become or remain in a forward direction while the tool bar 100 is rotated at an angle that is greater than or less than perpendicular to the centerline of the tongue 110. Further, coupling the tools 108 to the sides A allows the tools 108 to face forward, irrespective of the angle of rotation of the tool bar 100 with respect to the centerline of the tongue 110. In an implementation comprising a seed drill for example, keeping the tools 108 (e.g., disk, shank, and boot) facing forward allows the seed drill to cut furrows parallel to the centerline of the tongue 110 and the direction of travel of the implement 102. Otherwise, the tools 108 would face and cut at an off-angle (rather than facing and cutting in the direction of travel) when the tool bar 100 is rotated, which may tend to drag the tools 108 through the soil, resulting in poor seed placement.

In an embodiment, rotating the tool bar 100 while maintaining the forward alignment of the tools 108, based on changing the shape of the geometric forms with the actuators 202, allows the implement 102 to cut furrows at a uniform depth and to place seed at a desired soil depth on a sidehill. Accordingly, in some embodiments, the actuators 202 may change the geometric shapes of the structure 104 to align the tool(s) 108 in a direction parallel to the centerline of the tongue 110 while the structure 104 is pivoted and/or rotated at an angle that is greater than or less than perpendicular to the centerline of the tongue 110, while aligning the tool(s) 108 in a vertical direction when the structure 104 is angled at an incline or a decline from horizontal.

In various embodiments, as shown in FIG. 5, the distance between the sides A and thus between the tools 108 can decrease as the rotation angle of the tool bar 100 increases (with respect to the centerline of the tongue 110). This is a result of the change to the geometric shapes formed by the sections 106. Consequently, the distance between furrows (in the case of a seed drill) may decrease with an increasing rotation angle of the tool bar 100.

However, as shown in FIG. 6, the tool bar 100 can be rotated to a very steep angle and a reasonable furrow spacing can be maintained. For example, a tool bar 100 with 24" furrow spacing, as illustrated at FIG. 6(A) (e.g., section 106 sides "A" are located 24" apart on the structure 104) at 0° rotation (perpendicular to the centerline of the tongue 110) has a furrow spacing distance of 14" when rotated to 54°, as illustrated at FIG. 6(E), which can be within an acceptable range of furrow spacing for many crops. In alternate embodiments, other furrow spacing can be achieved by tool bars 100 with greater or lesser section 106 dimensions, as illustrated at FIGS. 6(B)-6(D) for example.

Figure 7:
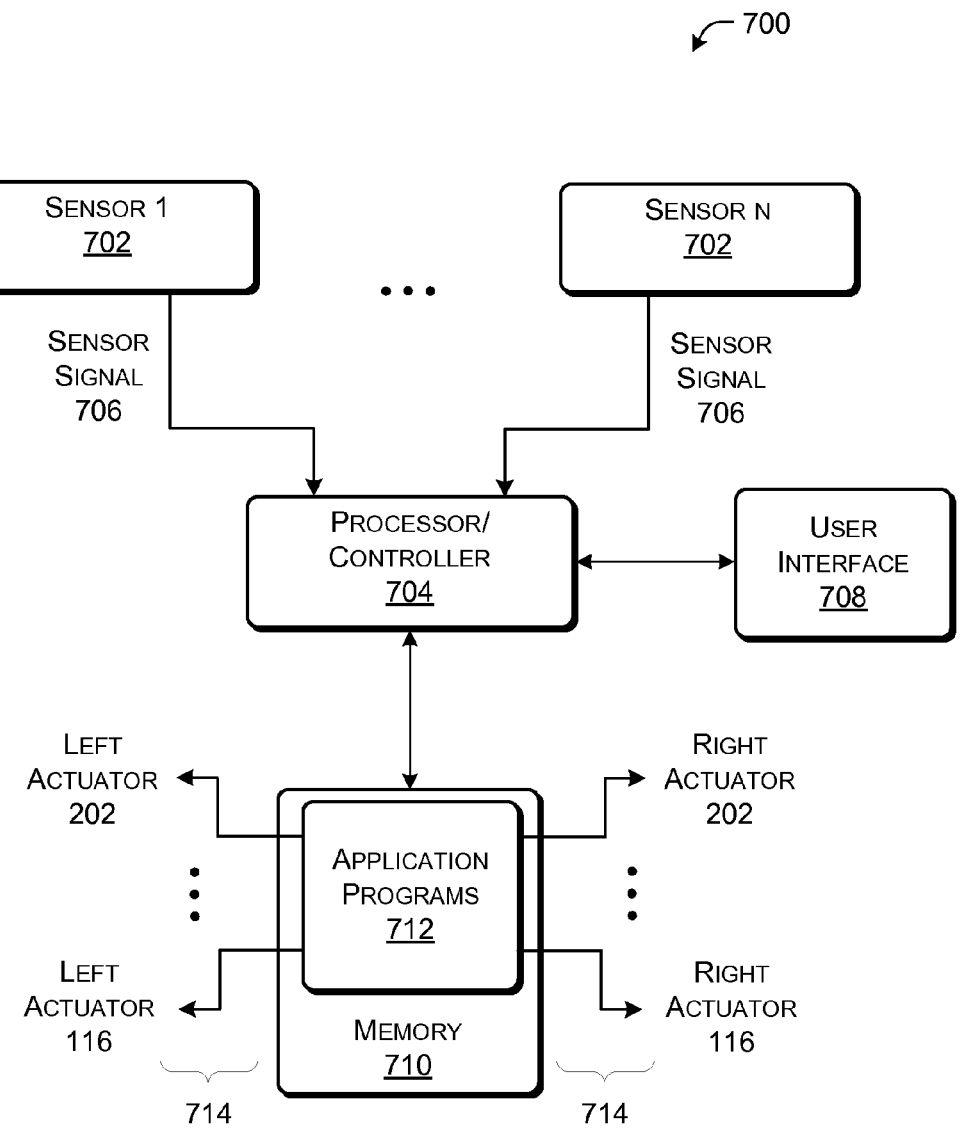
FIG. 7 is a block diagram of an example control system for use with a leveling tool bar assembly, according to an embodiment.

In various implementations, as shown in FIG. 7, the actuators 202 and/or 116 may be manually or automatically controlled via electrical and/or mechanical components (e.g., control system 700). In some embodiments, the actuators 202 and/or 116 may be automated, with the use of sensors 702, programmable controllers or processors 704, and the like, to automatically perform leveling adjustments to the structure(s) 104 as described above (e.g., changing the shape of the geometric forms of the lattice-like structure 104), and thus to the tool bar(s) 100, as an implement 102 traverses changing terrain. In an embodiment, the sensors 702, programmable controllers or processors 704, and actuators 202 and/or 116 automatically maintain the tools 108 in an alignment that is perpendicular to the true horizon and/or in an alignment that is parallel to the centerline of the tongue 110 while the implement 102 traverses the changing terrain, via the control system 700.

For example, in an implementation, the tool bar 100 includes one or more sensors 702 that communicate information to the processor 704, and the processor 704 generates one or more signals 706 that cause desired actuators 202 and/or 116 to extend or retract, based on the sensor information. In the implementation, the actuators 202 and/or 116 may be controlled and operated independently by the processor 704, to accommodate varying terrain. For instance, a tool bar 100 on the right side of the implement 102 may be controlled independently from a tool bar 100 on the left side of the implement 102.

In an embodiment, the processor 704 is arranged to control the actuators 202 and/or 116 automatically or based on manual input from a user, via a user interface (UI) 708, for example. The UI 708 may include a set of mechanical or electronic controls and indicators, a touch screen having controls and indicators, a display device, a joystick controller (physical or virtual), or the like. For example, the display device and/or the indicators may provide information to the user, whereby the user may manually make adjustments to the tool bar(s) 100, or may set the processor 704 to automatically make the adjustments as desired.

In another embodiment, the row (or furrow) spacing of the tools 108 of the tool bar(s) 100 may be preset for a specified automatic row spacing, or the spacing may be manually controlled, by the user via the UI 708, using the joystick, or the like. In either case, the processor 704 generates one or more signals that cause desired actuators 202 and/or 116 to extend or retract, rotating the tool bars 100 fore and aft with respect to the centerline of the tongue 110, and changing the shape of the structures 104 to maintain the forward alignment of the tools 108. In an implementation, the row spacing may be manually controlled or preset for automatic control (via the UI 708, using the joystick, etc.) independently for right and left side tool bars 100, or both together. As described above, controlling the row or furrow spacing may include controlling an angle of rotation (fore or aft) of the tool bar(s) 100, with respect to a centerline of the tongue 110 or a line perpendicular to the centerline of the tongue 110. For example, a preset tool bar 100 rotation angle may be selected to be automatically maintained (until a subsequent adjustment or reset is input), or may be manually adjusted, via the UI 708.

In an embodiment, one or more sensors 702 (such as linear encoder sensors, for example, or the like) may monitor the actual spacing of the rows or furrows (for the left and/or right tool bars 100) during operation. The spacing information may be displayed to the user via the UI 708 using the display, for instance. Additionally, the spacing information may be received and used by the processor 704 to make adjustments to the actuators 202 and/or 116 to automatically maintain the preset row spacing. For example, the processor 704 may be programmed to generate an adjustment signal for one or more actuators 202 and/or 116 when the measured spacing (by the sensors) deviates by a preset amount. Further, the processor 704 may be programmed to adjust the actuators 202 and/or 116 based on tool bar 100 movements due to uneven terrain, simultaneously with adjustments based on desired row spacing.

In one implementation, the automatic row spacing may be overridden (temporarily or longer-term) by the user via the UI 708 using the joystick, for example, if desired. For instance, the user may make manual adjustments to the tool bar(s) 100 during automatic operation. The UI 708 (for example, the joystick) may be arranged to return to a neutral position after the manual adjustments, and the tool bar(s) 100 may be arranged to return to their previous automatic settings (such as the preset row spacing) after the temporary manual control by the user.

In another implementation, the processor 704 may be arranged to receive ground speed information (e.g., via sensors 702, data from the farm tractor, etc.) of the implement 102. The ground speed information may be used to limit or restrict tool bar 100 adjustments in some cases. For example, in an implementation, the leveling and row spacing controls may be neutralized if the tools 108 are below the grade and the implement 102 is travelling at less than a minimum ground speed. In other words, the actuators 202 and/or 116 are restrained from moving the sections 106 when the tools 108 are in the ground and the implement 102 is not moving at least at a minimum speed. In the implementation, to prevent damage to the tools 108 or to other portions of the implement 102, the actuators 202 and/or 116 may only be adjusted when the implement 102 is in motion, or when the tools 108 are raised above the ground.

In various embodiments, the processor 704 or programmable controller may be communicatively coupled to a hardware memory storage device 710 (e.g., solid state, magnetic, optical, etc.). In some embodiments, application programs 712 may be stored in the memory 710 for use by the processor 704 in controlling the actuators 202 and/or 116 and thus the tool bar(s) 100. For example, application programs 712 may include an adjustment module, a row spacing module, and a leveling module. In some embodiments, the modules may be separate, and in other embodiments, one or more of the modules may be combined (e.g., a row spacing and leveling module, or the like). In other embodiments, the memory 710 may include the components of a data signals network (e.g., data storage, protocols, look-up tables, etc.).

In one example, an adjustment module may include one or more indicator/display components and one or more control components. In one embodiment, the adjustment module includes a touchscreen display/control that integrates the indicator/display functionality and the control functionality. In other embodiments, several hardware components are used for the desired functionality, such as a UI 708, having a joystick, indicators, a display, and controls, or the like, as discussed above. In these examples, the adjustment module includes programming run at the processor 704 to provide control to the actuators 202 and/or 116 and thus the tool bar(s) 100, based on input from the controls, and programming to provide feedback in the form of measurements, indicators, and the like, at the UI 708 or display, based on signals from the sensors 702.

In another example, a row spacing module and a leveling module (or a combination module) may include controls and indicators for leveling and/or row spacing the tool bar(s) 100, either individually (left or right) or in combination. In an implementation, these modules may include controls and indicators for setting the tool bars 100 in storage or transportation mode (i.e., folding the tool bars to the tongue 110). Further, the modules may include controls and indicators for providing a turn speed correction to the tool bars 100. For example, the turn speed correction may correct for proper leveling when the speed of the implement 102 while negotiating a curve or turn generates an erroneous leveling signal at the leveling sensors. In these examples, the adjustment module includes programming run at the processor 704 to provide control to the actuators 202 and/or 116 and thus the tool bar(s) 100, based on input from the controls, and programming to provide feedback in the form of measurements, indicators, and the like, at the UI 708 or display, based on signals from the sensors 702.

As previously discussed, in various implementations, one or more sensors 702 are located on and used with the tool bar(s) 100. While many different sensors 702 may be used, some possible sensors 702 include: tilt/slope sensors, row spacing sensors, implement speed and/or turn speed sensors, tool 108 depth sensors, and the like. For example, tilt/slope inclinometers may be located and used on the left and/or right tool bars 100. Row spacing sensors may include linear encoders, or the like. Ground speed sensors may be incorporated at or near the wheels of the implement 102, and the speed information derived from optical sensing, or from mechanical/geometric aspects of the wheel or like components. Other ground speed sensors may be based on global positioning satellite (GPS) signals, cellular signals, or the like. Tool depth sensors may include linear encoders, or the like.

Signals 706 generated by one or more of the sensors included with the implement 102 or the tool bar(s) 100 may be received by the processor 704 for processing and/or displaying to the user via a UI 708. Additionally, the generated signals 706 may be stored in the memory 710 for later recall or use. Sensor signals 706 received by the processor 704 may be converted to actuator control signals 714 by the processor 704, and sent to the desired actuators 202 and/or 116 for movement of one or more structures 106.

Representative Process

Figure 8:
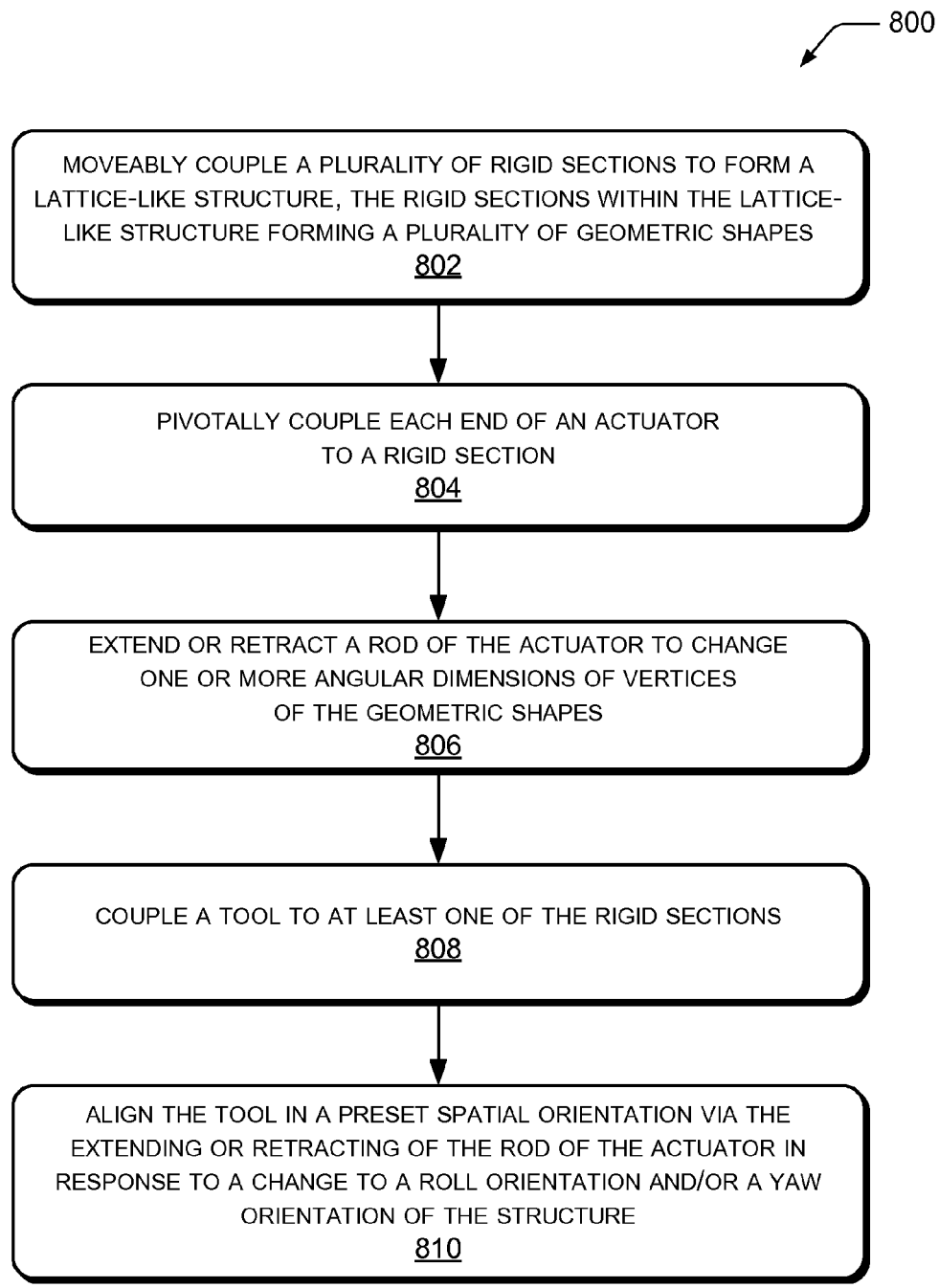
FIG. 8 is a flow diagram of an example process of aligning tools of a tool bar assembly, according to an embodiment.

FIG. 8 illustrates a representative process 800 for implementing techniques and/or devices relative to aligning tools of a tool bar assembly (such as tool bar 100, for example), according to various embodiments. The tool bar assembly may be a part of an agricultural implement (such as implement 102, for example). The process 800 includes coupling one or more tools (such as tools 108, for example) to the tool bar and aligning the tools in a desired alignment or orientation in response to an orientation change of the tool bar (or the implement). The example process 800 is described with reference to FIGS. 1-7.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable hardware, software, firmware, or a combination thereof, without departing from the scope of the subject matter described herein.

At block 802, the process includes moveably coupling a plurality of rigid sections (such as sections 106, for example) to form a lattice-like structure (such as structure 104, for example). The lattice-like structure comprises an open framework of rigid strips of material (the rigid sections), comprising a regular pattern of variable-angle polygons. In an implementation, the rigid sections within the lattice-like structure form a plurality of geometric shapes, as described above. In an embodiment, the process includes pivotally coupling the structure to a yoke, coupling the yoke to a tongue, and forming at least a portion of an agricultural implement with the structure, the yoke, and the tongue.

At block 804, the process includes pivotally coupling each end of an actuator (such as actuator 202, for example) to a rigid section. For instance one end of the actuator may be coupled to a first rigid section and the other end of the actuator may be coupled to a second rigid section. The first and second rigid sections may be pivotally coupled together at one end of the rigid sections, and the actuator may be arranged between the sections to change an angle of the vertex formed by the coupled end of the two rigid sections when the actuator extends and retracts. In various embodiments, multiple actuators may be coupled to pairs of rigid sections for convenience or efficiency.

In an alternate embodiment, the actuator may be coupled to a rigid section at one end and coupled to a frame, beam, or other stationary formation of the structure or the implement at the other end. In the embodiment, the rigid structure may be pivotally coupled to the stationary formation, and the actuator may be arranged to move the rigid structure by acting on it (pulling it or pushing it) with respect to the stationary formation.

At block 806, the process includes extending or retracting a rod of the actuator to change one or more angular dimensions of vertices of the geometric shapes. With the actuator arranged to push two rigid sections apart or to pull two rigid sections together, the angle of the vertex formed by the two rigid sections changes as the actuator extends or retracts. This results in a change to the shape of the geometric shapes formed by the rigid sections. The change is perpetuated across each of the geometric shapes of the lattice structure.

At block 808, the process includes coupling a tool to at least one of the rigid sections. The tool may be coupled to a rigid structure having an orientation that is desirable for the action of the tool. For example, digging tools may be coupled to a downward oriented rigid structure, and so forth.

At block 810, the process includes aligning the tool in a preset spatial orientation via the extending or retracting of the rod of the actuator in response to a change to a roll orientation and/or a yaw orientation of the structure. When the structure experiences a change in orientation, the rigid sections can undergo a change in orientation by extending or retracting the actuator, changing the shape of the lattice-like structure.

For example, in an implementation, the process includes aligning the tool in a vertical position while the structure is angled at an incline or a decline from horizontal. The structure tilt indicates a change in the roll orientation of the structure, which if left uncorrected, would result in the tool acting on the soil at a non-ideal angle. To correct for the tilt of the structure, the actuator(s) extend or retract, changing a shape of the structure and changing an orientation of the rigid sections, such that the tool is aligned in a vertical position (i.e., plumb, perpendicular to the true horizon) since the tool is coupled to one of the rigid sections. In various implementations, the correction can be made manually or automatically via controls or a control system.

In an implementation, the process includes coupling a first end of another actuator to the structure and coupling a second end of the other actuator to the tongue. The process includes extending or retracting a rod of the other actuator to pivot the structure with respect to a centerline of the tongue (a yaw orientation change), so that one end of the structure leads another end of the structure when the agricultural implement is pulled by the tongue.

A yaw orientation change of the structure, where the structure is no longer perpendicular to a centerline of the tongue, results in the tools being misaligned with the direction of travel of the implement. Since the structure is pivoted into a non-perpendicular orientation, the tools cutting surfaces or planting components are angled with respect to the desired direction of their operation (e.g., the direction of travel). In the implementation, the process includes aligning the tool in a direction parallel to the centerline of the tongue while the structure is pivoted at an angle that is greater than or less than perpendicular to the centerline of the tongue.

To correct for the yaw of the structure, the actuator(s) extend or retract, changing a shape of the structure and changing an orientation of the rigid sections, such that the tool is aligned in a forward position (i.e., parallel to a centerline of the tongue, parallel to the direction of travel) since the tool is coupled to one of the rigid sections. In various implementations, the correction can be made manually or automatically via controls or a control system.

In an implementation, the process includes automatically adjusting or maintaining a row spacing of the agricultural implement by extending or retracting the rod of the other actuator to pivot the structure with respect to the centerline of the tongue. For example, when the structure is pivoted to an angle that is greater or less than perpendicular to the centerline of the tongue, a spacing between the tools decreases. Thus, the spacing between rows or furrows can be controlled by pivoting the structure at the yoke, with respect to the centerline of the tongue. In various implementations, the row spacing (e.g., structure pivoting) can be adjusted or maintained manually or automatically via controls or a control system.

When the spacing of the rows changes, the alignment of the tools may need correction as well due to the angle of the pivot of the structure, as described above. Further, if the structure (e.g., the implement) is traversing uneven terrain, the structure may experience various roll tilts as well, as the implement encounters slopes and sidehills. With a tilt of the structure, the vertical alignment of the tools may need correction as well due to the angle of the roll of the structure, as described above. In various implementations, the pivoting and yaw and roll corrections can be made manually or automatically via controls or a control system.

For example, in an embodiment, the process includes automatically extending or retracting the rod of the actuator to change one or more angular dimensions of vertices of the geometric shapes, or extending or retracting the rod of the other actuator to pivot the structure relative to the centerline of the tongue, in response to one or more control signals generated by a control system based on one or more sensor signals received at the control system from one or more sensors located on the agricultural implement.

In alternate implementations, other techniques may be included in the process in various combinations, and remain within the scope of the disclosure.

CONCLUSION

While various discreet embodiments have been described throughout, the individual features of the various embodiments may be combined to form other embodiments not specifically described. The embodiments formed by combining the features of described embodiments are also leveling tool bar assemblies.

What is claimed is:

1. An apparatus, comprising:
    a plurality of rigid sections moveably coupled together to form a lattice-like structure comprising an open framework comprised of a regular pattern of variable-angle polygons, the rigid sections arranged to form a plurality of geometric shapes within the lattice-like structure;
    an actuator pivotally coupled to a rigid section at each end of the actuator and arranged to change one or more angular dimensions of vertices of the geometric shapes by extending or retracting a rod of the actuator; and
    a tool coupled to at least one of the rigid sections, the tool being aligned in a vertical position while the structure is angled at an incline or a decline from horizontal.

2. The apparatus of claim 1, further comprising a yoke and a tongue, the structure being pivotally coupled to the yoke and the yoke being coupled to the tongue, the structure, the yoke, and the tongue forming at least a portion of an agricultural implement.

3. The apparatus of claim 2, further comprising another actuator coupled to the structure at a first end of the other actuator and coupled to the tongue of the implement at a second end of the other actuator and arranged to pivot the structure toward the tongue or away from the tongue.

4. The apparatus of claim 1, further comprising a control component arranged to automatically activate the actuator to change the one or more angular dimensions of vertices of the geometric shapes, aligning the tool in a vertical direction when the structure is angled at an incline or a decline from horizontal.

5. The apparatus of claim 1, wherein the geometric shapes comprise parallelograms and wherein the tool is coupled to a vertically arranged side of one of the parallelograms.

6. The apparatus of claim 1, wherein the actuator is arranged to dynamically maintain an alignment of the tool in the vertical position while an angle of the structure varies with respect to horizontal.

7. The apparatus of claim 1, wherein the apparatus comprises a portion of an agricultural implement and wherein the actuator is arranged to dynamically maintain an alignment of the tool in the vertical position while the agricultural implement traverses sloped or uneven terrain.

8. The apparatus of claim 1, wherein the tool comprises a seed planting tool or a furrow digging tool.

9. An apparatus, comprising:
    a plurality of rigid sections moveably coupled together to form a lattice-like structure comprising an open framework comprised of a regular pattern of variable-angle parallelograms, the rigid sections arranged to form a plurality of geometric shapes within the lattice-like structure;
    an actuator pivotally coupled to a rigid section at each end of the actuator and arranged to change one or more angular dimensions of vertices of the geometric shapes by extending or retracting a rod of the actuator;
    a tongue coupled to the structure via a yoke, the yoke being coupled to the tongue and the structure being pivotally coupled to the yoke;
    another actuator coupled to the structure at a first end of the other actuator and coupled to the tongue at a second end of the other actuator and arranged to pivot the structure at the yoke so that one end of the structure leads another end of the structure when the apparatus is pulled by the tongue; and
    a tool coupled to at least one of the rigid sections, the tool being aligned in a direction parallel to a centerline of the tongue while the structure is pivoted at an angle that is greater than or less than perpendicular to the centerline of the tongue.

10. The apparatus of claim 9, wherein the tool is aligned in a vertical position while the structure is angled at an incline or a decline from horizontal.

11. The apparatus of claim 10, further comprising a control component arranged to automatically activate the actuator to change the one or more angular dimensions of vertices of the geometric shapes, aligning the tool in a direction parallel to the centerline of the tongue while the structure is pivoted at an angle that is greater than or less than perpendicular to the centerline of the tongue, and aligning the tool in a vertical direction when the structure is angled at an incline or a decline from horizontal.

12. The apparatus of claim 9, wherein the actuator is arranged to dynamically maintain an alignment of the tool in a vertical position and to align the tool in a direction parallel to the centerline of the tongue while the structure is pivoted at an angle that is greater than or less than perpendicular to the centerline of the tongue and while an angle of the structure varies with respect to horizontal.

13. The apparatus of claim 9, wherein the apparatus comprises a portion of an agricultural implement and wherein the actuator is arranged to dynamically maintain an alignment of the tool in a vertical position and to align the tool in a direction parallel to the centerline of the tongue while the structure is pivoted at an angle that is greater than or less than perpendicular to the centerline of the tongue and while the agricultural implement traverses sloped or uneven terrain.

14. The apparatus of claim 9, wherein the tool comprises a seed planting tool or a furrow digging tool.

15. A method, comprising:
    moveably coupling a plurality of rigid sections to form a lattice-like structure comprising an open framework comprised of a regular pattern of variable-angle parallelograms, the rigid sections within the lattice-like structure forming a plurality of geometric shapes;
    pivotally coupling each end of an actuator to a rigid section;
    extending or retracting a rod of the actuator to change one or more angular dimensions of vertices of the geometric shapes;
    coupling a tool to at least one of the rigid sections; and
    aligning the tool in a preset spatial orientation via the extending or retracting of the rod of the actuator in response to a change to a roll orientation and/or a yaw orientation of the structure.

16. The method of claim 15, further comprising aligning the tool in a vertical position while the structure is angled at an incline or a decline from horizontal.

17. The method of claim 15, further comprising pivotally coupling the structure to a yoke, coupling the yoke to a tongue, and forming at least a portion of an agricultural implement with the structure, the yoke, and the tongue.

18. The method of claim 17, further comprising:
coupling a first end of another actuator to the structure;
coupling a second end of the other actuator to the tongue;
extending or retracting a rod of the other actuator to pivot the structure with respect to a centerline of the tongue, so that one end of the structure leads another end of the structure when the agricultural implement is pulled by the tongue; and
aligning the tool in a direction parallel to the centerline of the tongue while the structure is pivoted at an angle that is greater than or less than perpendicular to the centerline of the tongue.

19. The method of claim 18, further comprising automatically adjusting or maintaining a row spacing of the agricultural implement by extending or retracting the rod of the other actuator to pivot the structure with respect to the centerline of the tongue.

20. The method of claim 17, further comprising automatically extending or retracting the rod of the actuator to change one or more angular dimensions of vertices of the geometric shapes in response to one or more control signals generated by a control system based on one or more sensor signals received at the control system from one or more sensors located on the agricultural implement.

* * * * *